United States Patent
Villette et al.

[11] Patent Number: 5,601,717
[45] Date of Patent: Feb. 11, 1997

[54] FILTER MEDIA CARTRIDGE

[75] Inventors: Guy Villette, Saint Vallier de Thiey; Claude Terracol, Brie Angonnes, both of France

[73] Assignee: Siebec S.A., France

[21] Appl. No.: 550,756

[22] Filed: Oct. 31, 1995

[30] Foreign Application Priority Data

Nov. 9, 1994 [FR] France ................... 94 13785

[51] Int. Cl.$^6$ .............................................. B01D 27/06
[52] U.S. Cl. .................................... 210/493.1; 210/493.2; 210/493.5; 55/497; 55/498; 55/500; 55/521
[58] Field of Search ................. 210/493.1, 493.2, 210/493.5; 55/497, 498, 500, 503, 521

[56] References Cited

U.S. PATENT DOCUMENTS

| | | | |
|---|---|---|---|
| 3,314,546 | 4/1967 | Briggs et al. | 210/493.1 |
| 3,362,541 | 1/1968 | Briggs et al. | 210/493.1 |
| 3,392,843 | 7/1968 | Mumby | 210/493.1 |
| 3,487,943 | 1/1970 | Buckman | 210/493.1 |
| 3,520,417 | 7/1970 | Durr et al. | 210/493.1 |
| 3,528,557 | 9/1970 | Luchetta | 210/493.1 |
| 4,046,697 | 9/1977 | Briggs et al. | 210/493.1 |
| 4,547,950 | 10/1985 | Thompson . | |
| 4,559,138 | 12/1985 | Harms, II | 210/493.1 |

FOREIGN PATENT DOCUMENTS

| | | |
|---|---|---|
| 6610045 | 8/1965 | Germany . |
| 1922535 | 9/1965 | Germany . |
| 1813498 | 5/1993 | U.S.S.R. . |
| 2136278 | 9/1984 | United Kingdom . |

*Primary Examiner*—W. L. Walker
*Attorney, Agent, or Firm*—Parkhurst, Wendel & Burr, L.L.P.

[57] ABSTRACT

A filter cartridge has a pleated filter media rolled into a cylinder, a tubular core, moulded from plastic with alternate grooves and ridges provided at the outer surface and a collar with uniformly spaced teeth which envelopes the filter media to rigidly space the pleats. The collar is retained by friction and it may be displaced towards the end caps of the cartridge. The core may be withdrawn from the filter media of a waste cartridge and utilized in a new cartridge. The upper end cap has a handle with a hinge provided by a reduced section of the plastic material.

12 Claims, 2 Drawing Sheets

5,601,717

FILTER MEDIA CARTRIDGE

BACKGROUND OF THE INVENTION

The present invention relates to a filter media in the form of a pleated cylindrical cartridge, which is located in a tank for filtering a liquid or a gas flow. The filter media defines a plurality of radially extending pleats and the inner extremities of the pleats define a cylindrical interior chamber, wherein a cylindrical tubular retainer or core is located at the inner ends of the pleats. End caps are located at the ends of the cartridge. The cleaning of such cartridges is not easy and they are frequently changed and dumped. Such filtering systems are very expensive.

SUMMARY OF THE INVENTION

An object of the present invention is to provide a filter cartridge including a core moulded from rigid plastic, which is easily separable from the other parts of the cartridge. When the cartridge needs to be replaced, the core is removed from the waste filter media and inserted into a clean new filter media to provide a new cartridge. The other parts, such as the filter media and the end caps, are compacted and collected according to the materials for salvage. The cartridge is advantageously cylindrical and hollow and a tubular core with openings is inserted between the inner extremities of the pleats. The fluid, for instance the water, may flow through the filter media, the openings and the tubular core. The core has sufficient rigidity to maintain the inner extremities of the filter media pleats and the openings are arranged to prevent any penetration of the filter media into the openings. The openings are constituted by circular grooves, staggered along the outer side of the core and by verticle bores or passage ways which establish communication between the grooves and the interior of the core. The core may be constituted by two or more superimposed elements to increase the filter cartridge capacity.

Another object of the present invention is to provide a filter cartridge having a handle for easily lifting out the cartridge from the filter tank, four cleaning or replacing, and for easily removing the core from the filter media. The handle, in the form of a suit-case handle, is moulded from plastic together with the upper cap and it comprises a zone of reduced section to provide a hinge.

The filter media is formed into pleats covered at the ends by caps and a collar extends around the outer extremities of the pleats and partially between the pleats, for spacing the folds and maintaining a great amount of filter area. Conventional collars are rigidly secured to the filter media and the cleaning of the latter is not easy. Another object of the invention is to provide a filter cartridge which may be easily cleaned, so that its frequent changing is not necessary.

The filter cartridge according to the present invention comprises a collar, circumferentially extending around the outer extremities of the filter media pleats and extending partially between the pleats to maintain the outer extremities of the pleats in spaced relationship, which collar is frictionally mounted on the filter media so that it is slidable and movable towards the end caps of the cartridge, to set free the pleats.

The collar, which envelopes the filter media, is advantageously made of a plastic material, such as polypropylene, and uniformly spaced teeth are staggered along its peripheral inner side. The spacing of the teeth corresponds to the spacing of the pleats and each of the teeth is inserted between adjacent folds or pleats of the filter media to uniformly and rigidly space the pleats. The toothed collar is only retained by friction and its longitudinal displacement along the cartridge towards the upper or lower cap is possible so that the pleats are free and easy to clean. Subsequently the collar is slided back to its initial position or to another one. A plurality of collars may be disposed on a cartridge of great height.

DESCRIPTION OF THE PREFERRED EMBODIMENT

The invention will be further described, by way of example, with reference to the accompanying drawings, in which.

Figure 1:
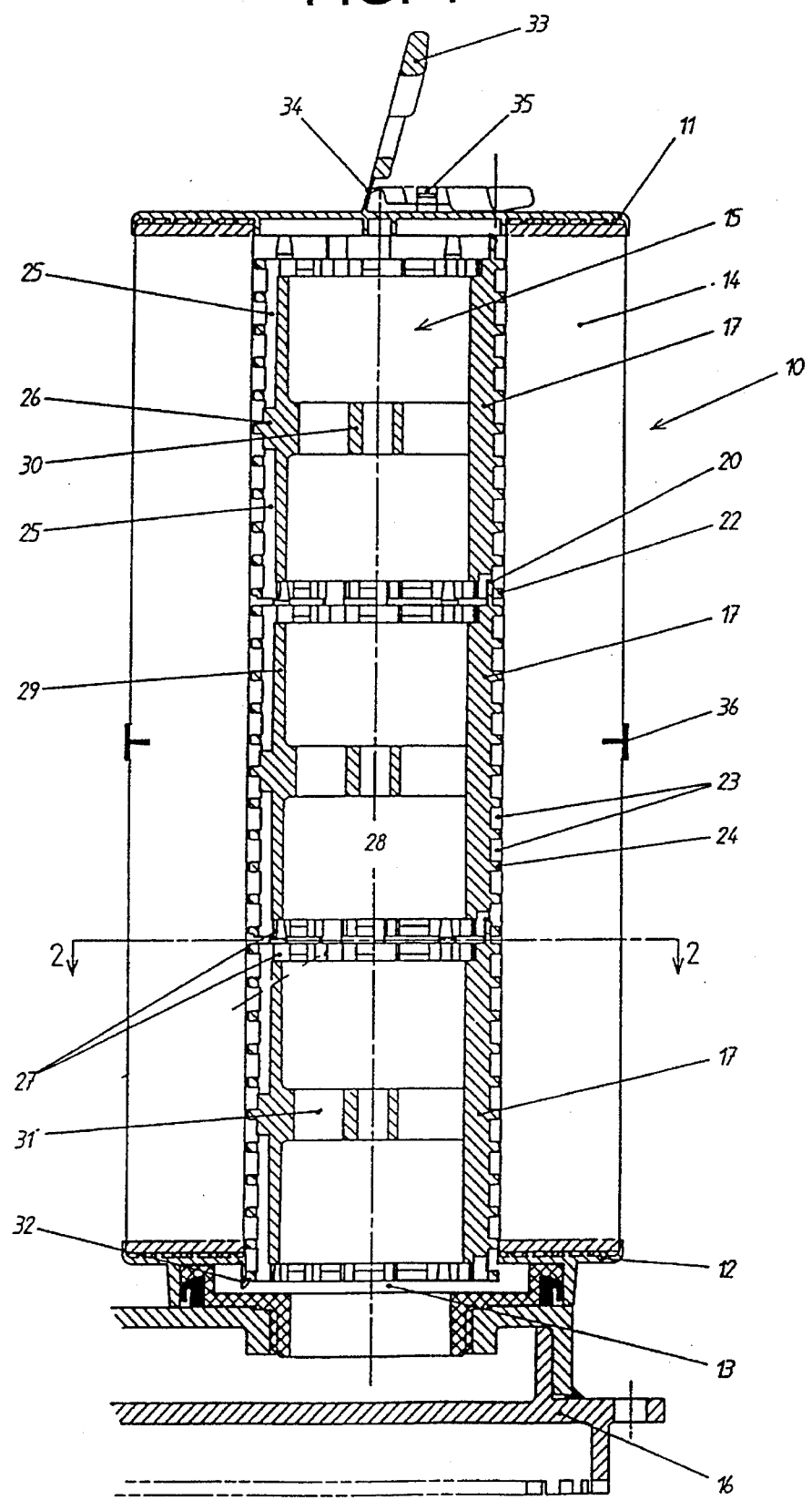
FIG. 1 is a schematic elevational view, in cross section taken along the line 1—1 of FIG. 2, of a cartridge in accordance with the invention.
Figure 2:
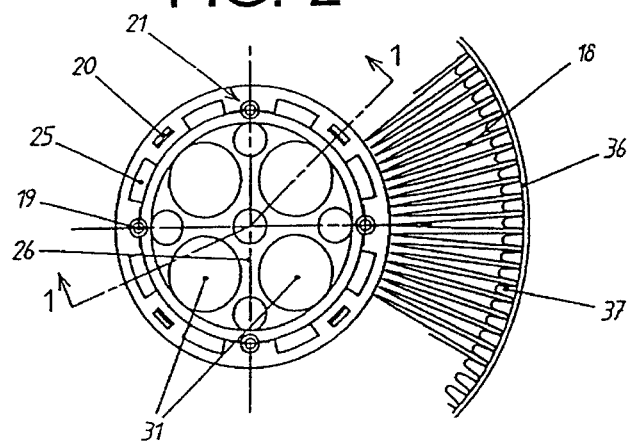
FIG. 2 is a sectional view taken along the line 2—2 of FIG. 1.
Figure 3:
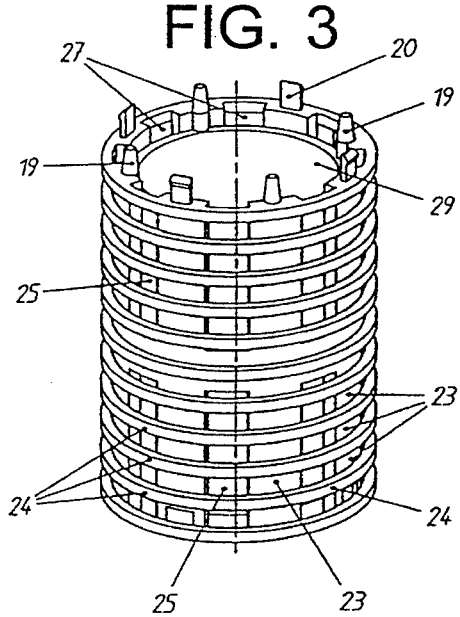
FIG. 3 is a perspective view of a core element.

Referring to FIG. 1 a filter media cartridge, for instance of a swimming-pool filter system, is indicated at 10. The cartridge 10 includes a filter media 14, such as paper or plastic, formed into pleats 18 and rolled into a cylinder, covered by an upper disk shaped cap 11 and a lower disk shaped lower cap 12 having a central opening 13. A cylindrical tubular core 15, having a smaller section than the central opening 13, is located in the inner chamber formed by the inner extremities of the pleats 18 to maintain these extremities. A circumferentially extending collar 36 is located at the outer extremities of the pleats 18 and the collar 36 inner surface has uniformly spaced teeth 37, which extend partially between the pleats 18, the number of teeth 37 being equal to the number of pleats 18. Each axial extremity of the filter media 14 is suitably bonded, for instance pasted, to the respective upper and lower cap 11,12. Such a well known cartridge 10 is arranged within a tank, only the bottom 16 of the tank being shown on FIG. 1. The water flows through the filter media 14 from the outside inwardly towards the inner chamber 28 of the hollow core 15.

The core 15 as shown in FIG. 1 of the drawings, is an assembly of three superimposed elements 17, but the core may be in one element or in another number of elements 17. The upper surface of each element 17 has upwardly protruding frusto-conical protrusions 19 which fit in conjugated holes 21, provided in the lower surface of the adjacent element 17 for centering the assembled elements 17. The upper surface further has tabs 20 hooked to an edge 22 of the lower surface of the adjacent element 17 to lock the elements 17 together. The cylindrical outer side of the core 15 includes alternated circular grooves 23 and ridges 24 staggered along the core length. The width of the grooves 23, for instance about 6 mm, allows the passage of the water and the ridges 24, having for instance a width of 3 mm, maintain the inner extremities of the pleats 18. Longitudinally extending bores or passage ways 25, open on the side of the grooves 23, provide communication between the grooves 23 and these bones 25 have outlets 27, communicating with the core central chamber 28 near the extremities of the core 15 and/or of the core elements 17. A middle wall 26 divides each bore 25 into two parts. On the inner side of the grooves 23 and the bores 25, the core 15 includes a cylindrical solid part 29 providing rigidity. The thickness of that solid part 29 is about 3 mm, substantially equal to the depth of the grooves 23 and of the bores 25. Inside the element 17 and for instance at the middle of the element is located a transverse wall 30 with openings 31 through which the water can flow.

The core element 17 is moulded from rigid plastic and several elements 17 may be superimposed to provide cores 15 of different heights. The core 15 is inserted through the central opening 13 of the lower cap 12 into the central chamber defined by the inner extremities of the pleats 18. The core 15 is maintained by friction within the filter media 14 or advantageously, as shown in FIG. 1, is locked in the inserted position by tabs 32, rigidly secured to the lower cap 12, and engaging the lower edge of the core 15. The locking force is sufficient to normally maintain the core 15, but does not prevent the extraction of the core 15 when a very substantial force is exerted thereon, for instance to break the locking tabs 32. The core 15 can be removed from a wasted cartridge 10 through the opening 13 of the lower cap 12, of greater section, without requiring the loosening of any fasteners or the like and utilized for a new cartridge. The other parts, namely the filter media 14 and the end caps 11,12, are easily compacted.

Figure 4:
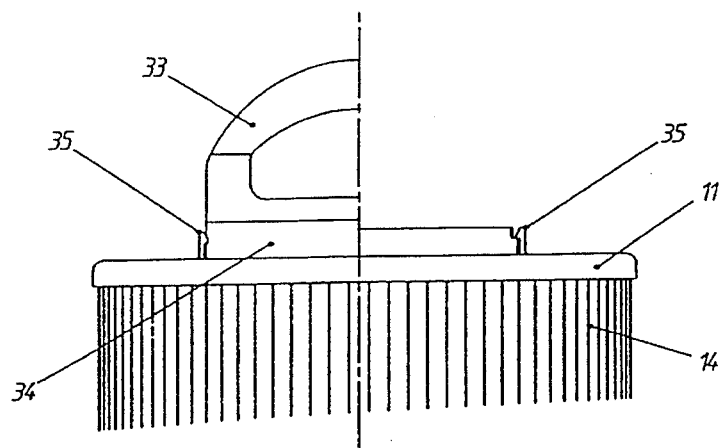
FIG. 4 is a view of the cartridge handle, shown on the left side in extended position and on the right side in the folded position.

As shown in FIGS. 1 and 4 the upper end cap 11 is provided with a handle 33, like a suit-case handle, to enable the cartridge 10 to be lifted out of the filter tank and/or to extract the core 15 out of filter media 14. The end cap 11 and the handle 33 are moulded together from plastic. The junction zone between the handle 33 and the cap 11 has a small section to provide a hinge 34 to enable the handle to be pivoted into a working position, shown on the left side of FIG. 1 or into a retracted position, shown on the right side. Locking hooks 35 maintain the handle 33 in that position.

The collar 36, which envelopes the outer contour of the filter media 14, is engaged on this filter media 14 and maintained in position by the friction forces. These forces do not prevent a longitudinal displacement of the collar 36, when it is manually pushed towards one of the end caps 11,12. After cleaning of the filter media 14 the collar 36 is pushed back to its initial position.

What is claimed is:

1. A filter cartridge, comprising:
   a pleated filter medium formed into a cylinder having upper and lower ends, the filter medium including radially extending pleats providing external folds defining an outer cylindrical contour and inner folds defining a central chamber;
   upper and lower end caps respectively closing the upper and lower ends of the filter medium, said lower end cap having an opening;
   a rigid hollow core provided in said central chamber of the filter medium; and
   an outer collar circumferentially surrounding the filter medium, the outer collar comprising a plurality of radially inner uniformly spaced teeth receiving therebetween the external folds of the pleats, the collar being slidable along the longitudinal axial direction of the filter medium toward each of the end caps.

2. The filter cartridge of claim 1, wherein the core is comprised of a molded plastic material.

3. A filter cartridge, comprising:
   a pleated filter medium formed into a cylinder having upper and lower ends, the filter medium including radially extending pleats providing external folds defining an outer cylindrical contour and inner folds defining a central chamber;
   upper and lower end caps respectively closing upper and lower ends of the filter medium, said lower end cap having an opening;
   a rigid hollow core provided in said central chamber of the filter medium, said hollow core being slidable in said central chamber and with respect to the filter medium; and
   an outer collar circumferentially surrounding the filter medium, the outer collar comprising a plurality of radially inner uniformly spaced teeth receiving therebetween the external folds of the pleats, wherein the core has a cross-section that is smaller than the opening in the lower end cap such that the core may be extracted therethrough.

4. The filter cartridge of claim 3, wherein said core comprises a non-perforated solid cylindrical wall that defines an interior of the core.

5. The filter cartridge of claim 4, wherein the core comprises a plurality of juxtaposed radially protruding circumferential ridges defining therebetween circumferential grooves for passage of fluid therealong.

6. The filter cartridge of claim 5, wherein the core comprises longitudinal bores intersecting the circumferential grooves, said longitudinal bores having outlets that communicate with the interior of the hollow core.

7. The filter cartridge of claim 3, wherein the core comprises a transverse wall extending through the interior of the hollow core.

8. The filter cartridge of claim 3, wherein the core comprises a plurality of stacked core elements rigidly locked together.

9. The filter cartridge of claim 3, wherein the lower end cap includes engagement tabs for locking the core to the lower end cap.

10. The filter cartridge of claim 3, wherein the core is comprised of a molded plastic material.

11. The filter cartridge of claim 3, further comprising a handle including a hinge portion attaching the handle to the upper end cap, the hinge portion being formed by a portion of reduced cross-section.

12. The filter cartridge of claim 11, wherein the end caps and the handle are comprised of a molded plastic material.

* * * * *